United States Patent
Yashayeva et al.

(10) Patent No.: US 10,380,011 B2
(45) Date of Patent: Aug. 13, 2019

(54) METHOD, APPARATUS, AND COMPUTER-READABLE MEDIUM FOR PERFORMING FUNCTIONAL TESTING OF SOFTWARE

(71) Applicant: Sparta Systems, Inc., Hamilton, NJ (US)

(72) Inventors: Nataliya Yashayeva, Morganville, NJ (US); Michael Pontoriero, Skillman, NJ (US); Derek Grzyb, Milltown, NJ (US)

(73) Assignee: Sparta Systems, Inc., Hamilton, NJ (US)

( * ) Notice: Subject to any disclaimer, the term of this patent is extended or adjusted under 35 U.S.C. 154(b) by 27 days.

(21) Appl. No.: 15/489,262

(22) Filed: Apr. 17, 2017

(65) Prior Publication Data

US 2017/0300405 A1    Oct. 19, 2017

Related U.S. Application Data

(60) Provisional application No. 62/323,484, filed on Apr. 15, 2016.

(51) Int. Cl.
   *G06F 9/44*      (2018.01)
   *G06F 11/36*    (2006.01)

(52) U.S. Cl.
   CPC ...... *G06F 11/3692* (2013.01); *G06F 11/3684* (2013.01); *G06F 11/3688* (2013.01)

(58) Field of Classification Search
   CPC ............. G06F 11/3664; G06F 11/3684; G06F 11/3688; G06F 9/44589
   See application file for complete search history.

(56) References Cited

U.S. PATENT DOCUMENTS

| | | | | |
|---|---|---|---|---|
| 9,189,377 | B1* | 11/2015 | Arkadyev | G06F 11/3688 |
| 2011/0265175 | A1* | 10/2011 | Bhat | G06F 11/3672 726/19 |
| 2014/0075242 | A1* | 3/2014 | Dolinina | G06F 11/3672 714/27 |
| 2015/0278393 | A1* | 10/2015 | Das | G06F 17/30557 707/601 |
| 2015/0286552 | A1* | 10/2015 | Michelsen | G06F 11/3684 714/38.1 |
| 2017/0185509 | A1* | 6/2017 | Arkadyev | G06F 11/3696 |

* cited by examiner

*Primary Examiner* — Adam Lee
(74) *Attorney, Agent, or Firm* — Amardeep S. Grewal; Reed Smith LLP

(57) ABSTRACT

A system, method and computer-readable medium for performing functional testing of software, including storing a plurality of statements in a plurality of cells, the plurality of cells being organized in a plurality of columns, the plurality of columns including a verification column and each statement in the verification column corresponding to an acceptance criterion for a step of a functional test of the software, storing a plurality of mappings linking the plurality of cells to a plurality of blocks of executable code, each block of executable code configured to execute commands on the software, executing the plurality of blocks of executable code to produce an output by iterating through the plurality of cells and executing each executable block of code linked to each corresponding cell, and transmitting an indication of whether the software meets acceptance criteria in the verification column based at least in part on the output.

21 Claims, 15 Drawing Sheets

| Step | Test Procedure | Key Data Elements | Expected Results | Pass/ Fail | Comments/ PR Reference |
|---|---|---|---|---|---|
| 1. | Create a Record in the Quality Assurance Project | | A record in the Quality Assurance Project has been created | | |
| 2. | Perform the Initiate Work Activity | | The record has progressed to the state of Work in Progress | | |
| 3. | Perform the Work Completed Activity | | The record has progressed to the state of Pending Approval | | |
| 4. | Verify that the following fields have been populated: <br>• Completed By <br>• Completed On | | The following fields have been populated: <br>• Completed By <br>• Completed On | | |
| 5. | Perform the Reject Activity | | The record has progressed to the state of Rejected | | |
| 6. | Verify that the following fields have been cleared <br>• Completed By <br>• Completed On | | The following fields have been cleared <br>• Completed By <br>• Completed On | | |
| 7. | Exit out of the record and return to the TrackWise Desktop | | User is returned to the TrackWise Desktop | | |

Scenario Outline Create Record
    Given a user is logged in with permissions
    When the user clicks on Create Record
        And the user selects <Project> and <Division>
        And the user completes all required fields
        And the user clicks save
    Then Create record appears on the desktop with required fields completed.
    Project | Division
    Project1 | DivisionA
    Project2 | DivisionB

Fig. 3A

1
    Scenario: Click Create Record Button
    Given a user is logged in with permissions
    When the user clicks on Create Record
    Then the project selection screen is displayed 2
    Scenario Outline Select Project and Division
    Given a user is on the Project Selection screen
    When the user selects <Project> and <Division>
    Then the Create Record form is displayed
        Project | Division
        Project1 | DivisionA
        Project2 | DivisionB 3
    Scenario: Complete form and Save
    Given the user is on the Create Record form
    When the user completes all required fields
    And the user clicks save
    Then Create record appears on the desktop with required fields completed.

Fig. 3B

| Scenario: Create Record | Given | When | Then |
|---|---|---|---|
| | A user is logged in with permissions | A user clicks on Create Record | The project selection screen is displayed |
| | | A user selects <Project> and <Division> | The Create Record form is displayed |
| | | A user completes all required fields and clicks save | Create record appears on the desktop with required fields completed |

Cells

Fig. 5

METHOD, APPARATUS, AND COMPUTER-READABLE MEDIUM FOR PERFORMING FUNCTIONAL TESTING OF SOFTWARE

RELATED APPLICATION DATA

This application claims priority to U.S. Provisional Application No. 62/323,484 filed on Apr. 15, 2016, the disclosure of which is hereby incorporated by reference in its entirety.

BACKGROUND

Behavior Driven Development (BDD) specifies that tests of any unit of software should be specified in terms of the desired behavior of the unit. The desired behavior is derived from the requirements set by the business—that is, the desired behavior that has business value for whatever entity commissioned the software unit under construction. FIG. 1A illustrates the position of BDD within the pyramid of software testing.

BDD tests are typically written using Gherkin. In Gherkin, each test is referred to as a "scenario" and each scenario includes a "given" step which refers to an initial program state, a "when" step defining an action, and a "then" step indicating the desired outcome. Each of the steps are then parsed with a parser and the appropriate testing script is executed. As Gherkin is typically written in a plain language targeted to business and other non-technical users, it allows for high level design and generation of BDD testing.

Functional testing refers to the process of verifying that a piece of software is conforms to end-user or business goals. Typically, functional testing involves evaluating and comparing each software function with the business requirements. Software is tested by providing it with some related input so that the output can be evaluated to see how it conforms, relates or varies compared to its base requirements. Moreover, functional testing also checks the software for usability, such as by ensuring that the navigational functions are working as required.

As shown in FIG. 1B, functional testing occurs after BDD testing and has historically been a manual effort. These validation tests are written in an industry standard test case format which is significantly more details then BDD testing. Positive and Negative scenarios are included and each step is verified.

As discussed earlier, Gherkin is utilized for higher level BDD tests. However, there are several difficulties with using Gherkin to write functional tests. As functional tests require verification of steps on a more granular level than BDD tests, writing functional tests with Gherkin can be verbose, since adding additional given/when/then steps are required. Additionally, the process of generating the Gherkin code can be time consuming, as Gherkin bears little resemblance to the industry standard functional test formats. Furthermore, while short Gherkin tests are useful for BDD testing with simple requirements, Gherkin cannot be used for functional testing which typically requires many different parameters. Since each of the steps in Gherkin must be separately parsed by a parser, a complicated parser would be required to handle the requirements of functional tests. Additionally, the step of parsing a free-form text file produces overhead in the form of computing inefficiencies and can be error-prone, raising implementation time and cost while lowering execution speed and computing efficiency.

BRIEF DESCRIPTION OF THE DRAWINGS

FIG. 2 illustrates an example of functional tests 201 in an industry standard format.

FIGS. 3A-3C illustrate examples of Gherkin-implemented functional test descriptions and processing of the descriptions.

FIG. 5 illustrates a Sparkin description including a plurality of statements stored in a plurality of cells which are organized in rows and columns according to an exemplary embodiment.

DETAILED DESCRIPTION

While methods, apparatuses, and computer-readable media are described herein by way of examples and embodiments, those skilled in the art recognize that methods, apparatuses, and computer-readable media for performing functional testing of software are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

FIG. 2 illustrates an example of functional tests 201 in an industry standard format. As shown in FIG. 2, the functional tests 201 includes a series of rows corresponding to tests, each of which includes a particular test procedure, any key data elements, expected results, and a column indicating whether the procedure passed the test.

As discussed in the background, using Gherkin to implement functional tests can be difficult, as the format of Gherkin does not bear any resemblance to the industry standard format used for functional tests. FIG. 3A illustrates an example of a Gherkin-implemented functional test description 301. As shown in FIG. 3A, the Gherkin syntax allows for one verification step at the end of each scenario, meaning that the Gherkin-implemented functional test description 301 does not include or reflect any intermediate verification steps which may be required as part of the functional test.

FIG. 3B illustrates an example of a Gherkin-implemented functional test description 302 if a user were to try to implement intermediate verification steps. As shown in the description 302, the number of scenarios and given/when/then statements increases greatly as the user attempts to define verification steps at a lower level of granularity.

As shown in FIGS. 3A-3B, the Gherkin descriptions can include scenarios and scenario outlines. As will be discussed further below, the steps in scenario outlines are not directly executed but act as a template to execute multiple iterations of the steps in the scenario outline using different data values, which are listed at the end of the scenario outline. In situations where data values are not being passed in, scenarios can be used to define a particular test.

Figure 3C:
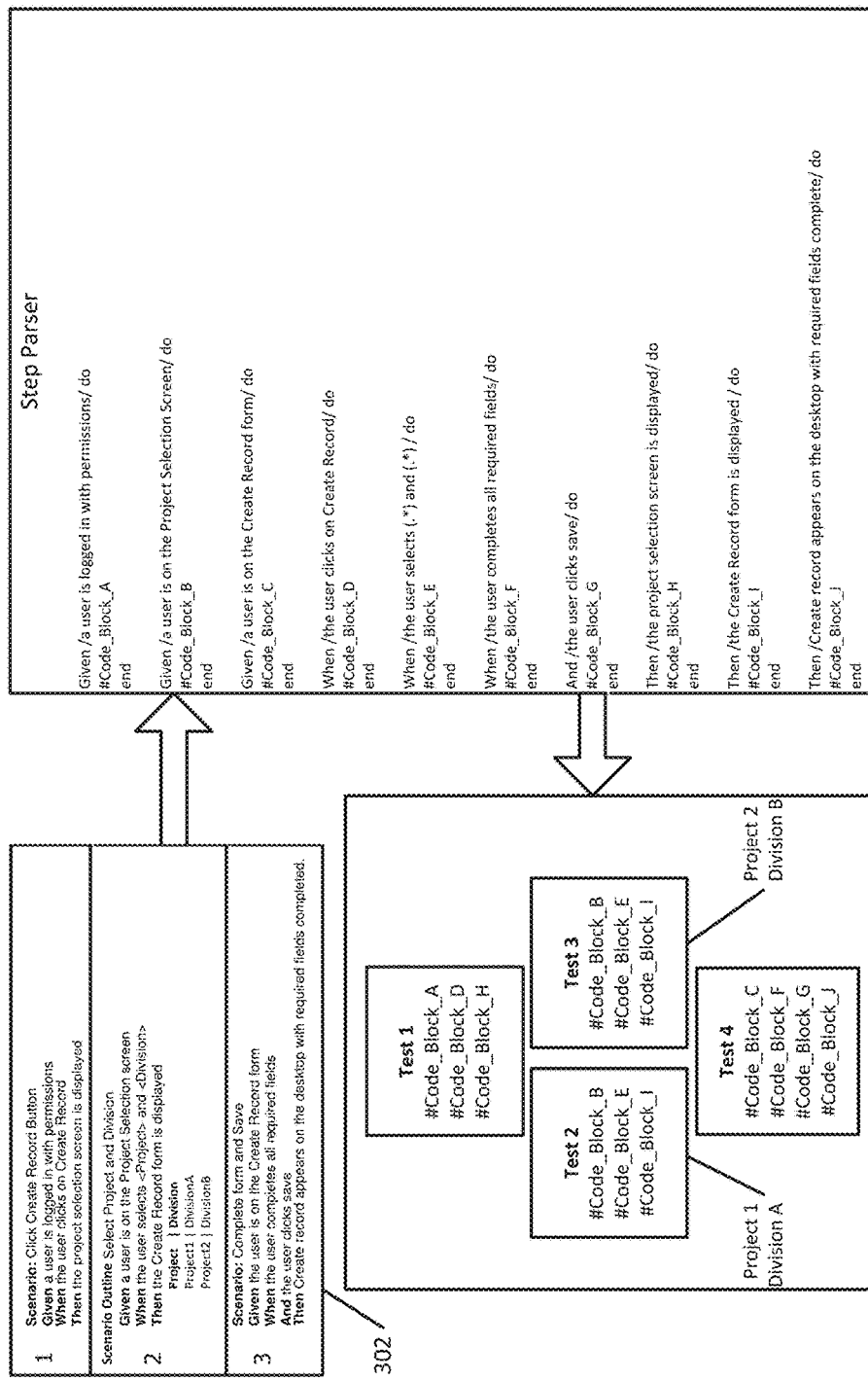

FIG. 3C illustrates the processing of the Gherkin code description 302 of FIG. 3B. As shown in FIG. 3C, each line of Gherkin other than the scenario and scenario outline descriptions (which are treated as comments by the parser) is parsed by a step parser 304 which then executes a block of code which implements one or more instructions on the software being tested. The step parser compares the text in each line of the Gherkin description 302 with regular expressions which are defined in a step definition file. When a regular expression matches a particular line in the Gherkin description, the corresponding code is executed. In the case of the scenario outline in the Gherkin description 302, the steps of that outline are repeated for each set of values of parameters "Project" and "Division."

Box 304 illustrates the tests that are executed on the software based on the parsing of the Gherkin description 302 by the parser 304. As shown in box 304, each scenario corresponds to a separate test, with the scenario outline corresponding to being repeated to result in execution of tests 2 and 3.

As discussed earlier, the increased length and complexity of Gherkin descriptions is the source of additional inefficiencies when it is time to execute the functional test. Since the Gherkin language must be parsed by a parser, the increased length of Gherkin can slow down execution of complex or lengthy functional tests. Additionally, since Gherkin requires language parsing, small typographical errors in the Gherkin code or description can cause significantly delays in testing. Furthermore, a user who is accustomed to the industry standard test case format shown in FIG. 2 would not readily be able to comprehend the particular tests which are being performed from a Gherkin description.

Applicant has discovered a method and system for performing functional testing of software (referred to herein as "Sparkin") which eliminates the need for processor-intensive parsing of steps while simultaneously presenting the steps of a functional test in format that is in accordance with the standard for functional testing. The method and system described herein also simplifies the input, storage, and processing of parameters which are part of functional test steps.

Figure 4:
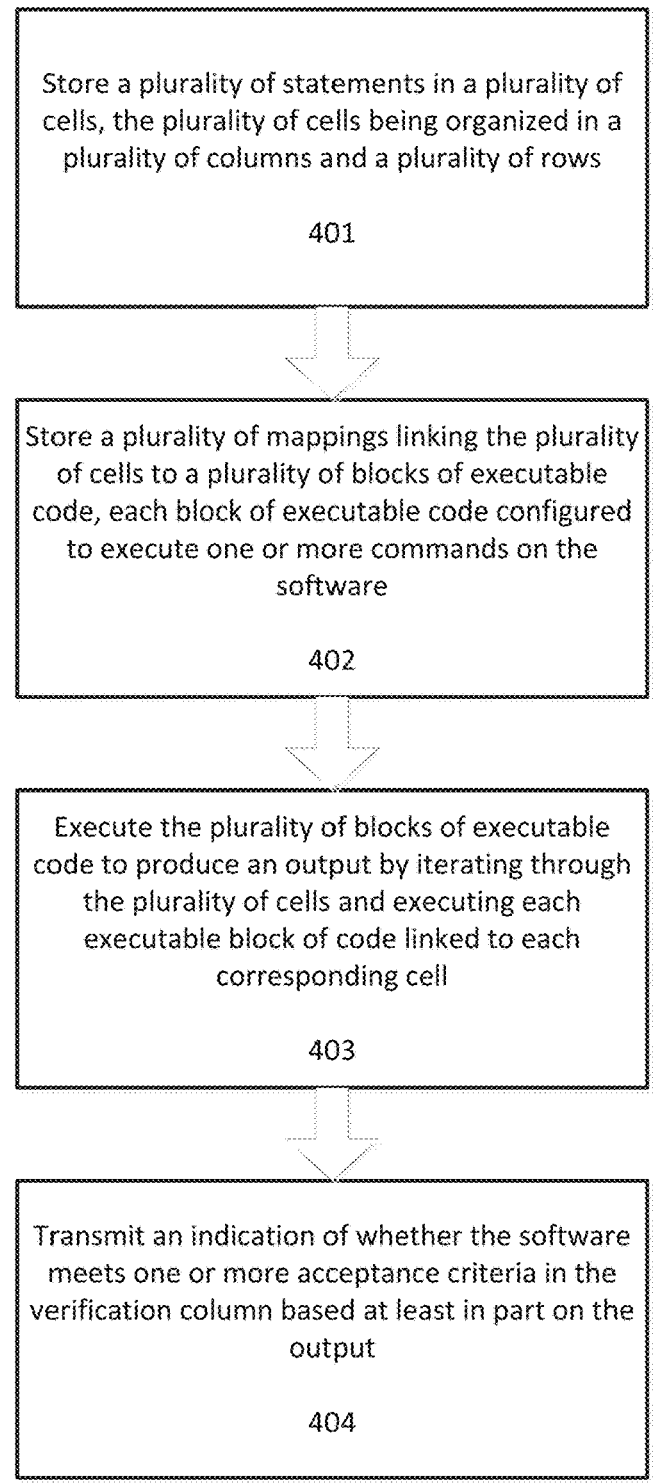
FIG. 4 illustrates a flowchart for performing functional testing of software according to an exemplary embodiment.

FIG. 4 illustrates a flowchart for performing functional testing of software according to an exemplary embodiment. At step 401 a plurality of statements are stored in a plurality of cells, the plurality of cells being organized in a plurality of columns and a plurality of rows.

FIG. 5 illustrates a Sparkin description 501 including a plurality of statements stored in a plurality of cells which are organized in rows and columns. The description 501 can be displayed as part of a user interface which is used with the Sparkin system. In the example of FIG. 5, there are 7 Sparkin Cells which store statements and two cells which are empty. As used herein, a statement can include any combination of one or more letters, numbers, spaces, punctuation, or any other character. The statements can be stored in the cells both from an interface perspective, meaning they are physically located within the cells on the interface, and from a storage perspective, meaning the statements are stored in a data structure which is linked to a data structure corresponding to particular cells in memory.

Each row of cells in the description 501 of FIG. 5 corresponds to a step in a functional test of some software being tested. For example, row 1 corresponds to a first step of the functional test, row 2 corresponds to a second step of the functional test, and row 3 corresponds to a third step of the functional test.

While the rows correspond to steps in the functional test, the columns correspond to stages within those steps. The columns of description 501 include a verification column, labeled the "Then" column. Each statement in the verification column corresponds to an acceptance criterion for a step of a functional test of the software. For example, the statement "The project selection screen is displayed" is an acceptance criterion for the first step of the functional test. This means that in order for the first step to be considered verified or to pass, the project selection screen must be displayed by the software.

The columns of description 501 also include a prerequisite column, labeled the "Given" column. Each statement in the prerequisite column corresponds to an initial condition of the software for a step of the functional test of the software. For example, the first step in description 501 includes an initial condition that "a user is logged in with permissions." When the executable code corresponding to this cell is executed, if a user is not already logged into the software with permissions, then a log-in operation will be performed.

Additionally, the columns of description 501 also include an action column, labeled the "When" column. Each statement in the action column corresponds to an action performed on the software for a step of the functional test of the software. For example, for step 3 of the functional test description 501, the cell corresponding to the action column requires that "a user completes all required fields and clicks save." When the executable code corresponding to this cell is executed, all required fields in the software will be completed and the save button will be activated.

Figure 6:
FIG. 6 illustrates an interface used present a Sparkin description according to an exemplary embodiment.

As discussed earlier, the Sparkin description can be presented as part of an interface, such as interface 601 illustrated in FIG. 6. Interface 601 includes a section 602 indicating various scenarios corresponding to various functional tests and also includes a section 603 having a plurality of cells which correspond to a particular scenario. For example the cells currently displayed in section 603 correspond to scenario 604 in section 602. The associations between groups of cells and scenarios can be stored in memory and utilized during the execution stage in certain situations where parameterized values are used, as is discussed further below. As shown in FIG. 6, the cells of section 603 are divided into rows corresponding to steps of the functional test and columns corresponding to stages of the steps.

Figure 7:
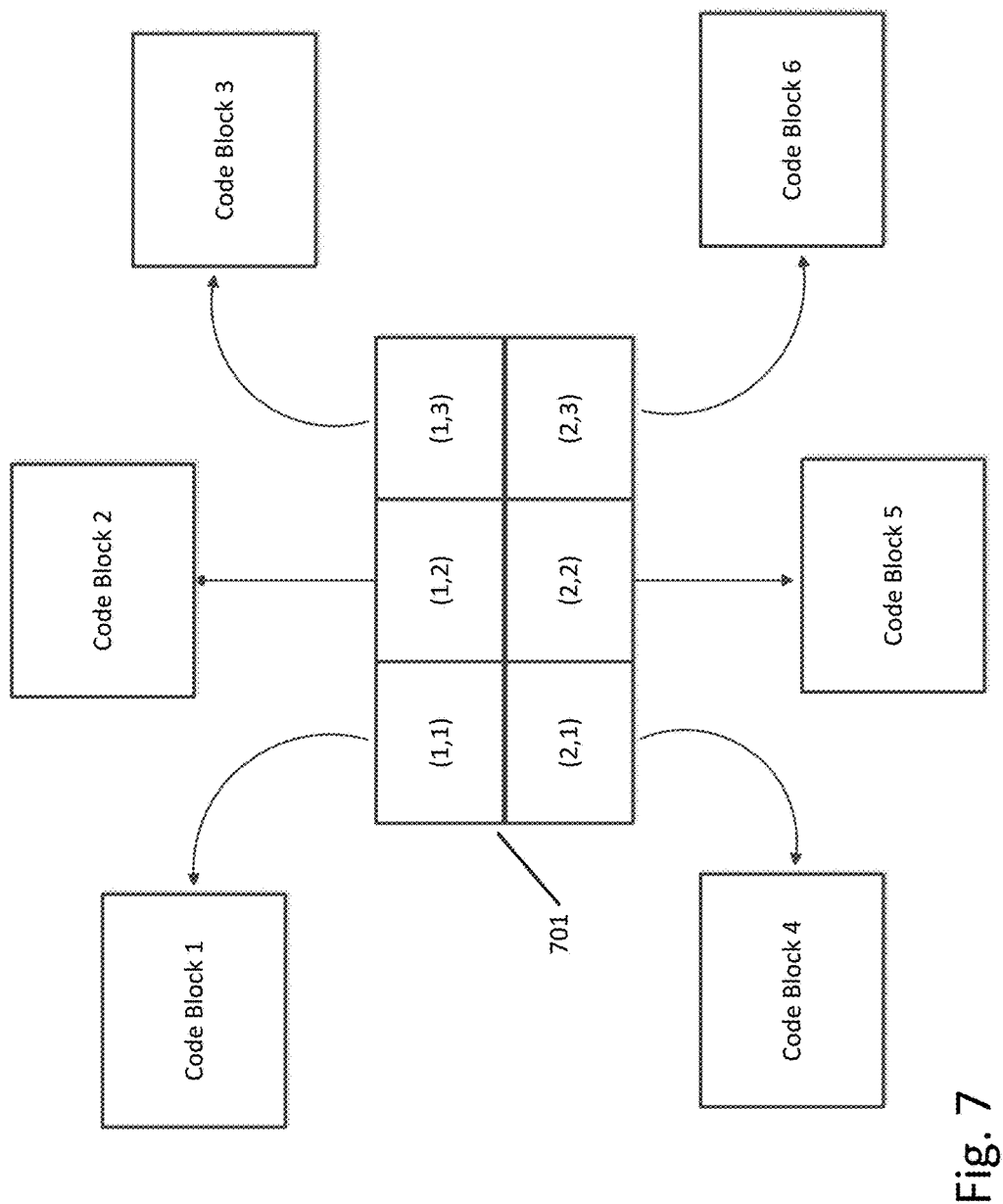
FIG. 7 illustrates the mappings between cells and the various blocks of executable code according to an exemplary embodiment.

Returning to FIG. 4, at step 402 a plurality of mappings are stored linking the plurality of cells to a plurality of blocks of executable code. FIG. 7 illustrates the mappings between cells 701 and the various blocks of executable code. For example, the cell in the second column and second row is mapped to executable code block 5. Each block of executable code is configured to execute one or more commands on the software. For example, if a statement in a cell is "enter login information on start screen," then the block of executable code mapped to that cell may comprise one or more instructions which, when executed, cause login information to be entered on a start screen of the software.

Figure 8:
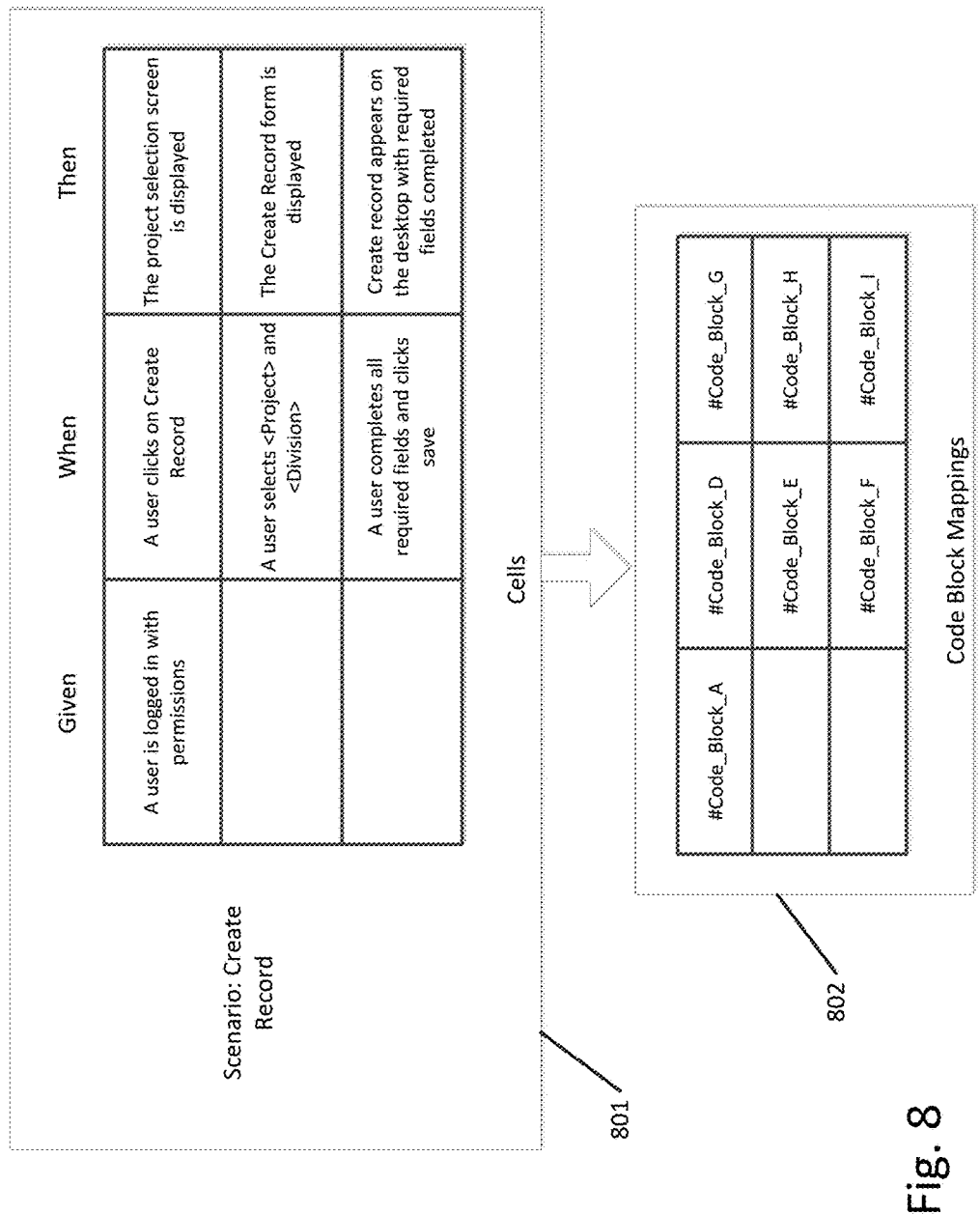
FIG. 8 illustrates an example of the mappings between cells in a Sparkin Create Record Scenario description and seven code blocks according to an exemplary embodiment.

FIG. 8 illustrates an example of the mappings 802 between cells in a Sparkin Create Record Scenario description 801 and seven code blocks. For example, the prerequisite column of the first step is mapped to code block A. The code blocks can be written in any programming language which effects the desired actions upon the software. For example, if the code blocks were implemented in Ruby and a cell was mapped to a code block configured to create two new Customer objects, then the code block could read:

cust1=Customer. new
cust2=Customer. new

Of course, a variety of different languages can be used to implement the code blocks and this example is not limiting.

The mappings between cells and code blocks can be stored in a data structure in memory, such as a table or one or more data objects designed to store associations between various Sparkin objects. Each cell can have either a unique id or can be referenced by column and row. Each code block can also have a unique id. The unique id (or row and column) of each cell can be linked to the unique id of the code block in a mapping stored in memory. As discussed further below, when a particular step of a functional test is carried out, the corresponding cells can pass the unique ids of their corresponding code blocks to a repository which stores the code blocks. The repository can then select the appropriate blocks for execution based on the unique ids.

The code blocks can also be configured to perform different functionality depending on the column of their corresponding mapped cells. For example, code blocks which are mapped to cells in the verification column can include commands/instructions which verify some aspect of the software performance, for example, by querying some data object in the software. Code blocks which are mapped to cells in the prerequisite column can include commands/instructions for verification of some aspect of software performance, as well as commands/instructions for performing some action using the software. Additionally, code blocks which are mapped to cells in the action column can include functionality for performing some action using the software, for example, instantiating a new object or selecting some aspect of a user interface.

Returning to FIG. 4, at step 403 the plurality of blocks of executable code are executed to produce an output by iterating through the plurality of cells and executing each executable block of code linked to each corresponding cell. This output can include data values stored in a memory structure associated with the software, one or more Boolean flags indicating a pass/fail outcome for one or more functional tests, an output of the software being tested, a characteristic, state, diagnostic measure or other property of a computing system which is executing the software, some combination of all of these, or any other output which is produced as a result of executing the plurality of blocks of executable code.

Figure 9:
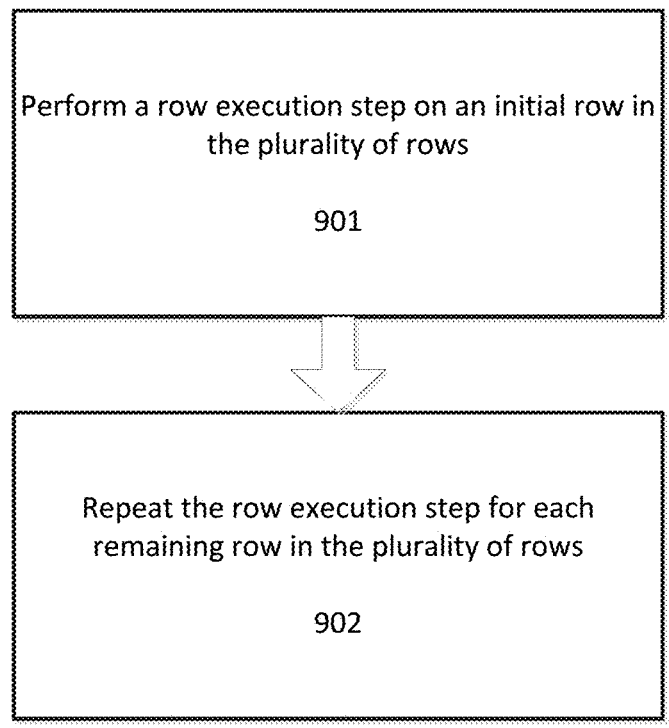
FIG. 9 illustrates a flowchart for executing the plurality of blocks of code according to an exemplary embodiment.

FIG. 9 illustrates a flowchart for executing the plurality of blocks of code. At step 901 a row execution step is performed on an initial row in the plurality of rows of the Sparkin description. Each row execution is performed in column order, from left to right. For example, the code block mapped to the cell in the prerequisite column of a step would be executed prior to the code block mapped to the cell in the action column, which would be executed prior to the code block mapped to the cell in the verification column. At step 902 the row execution step is repeated for each remaining row in the plurality of rows. A counter can be used to track the currently executing row relative to the remaining rows. Alternatively, the process can simply iterate until there are no remaining rows which have not been iterated through.

Figure 10:
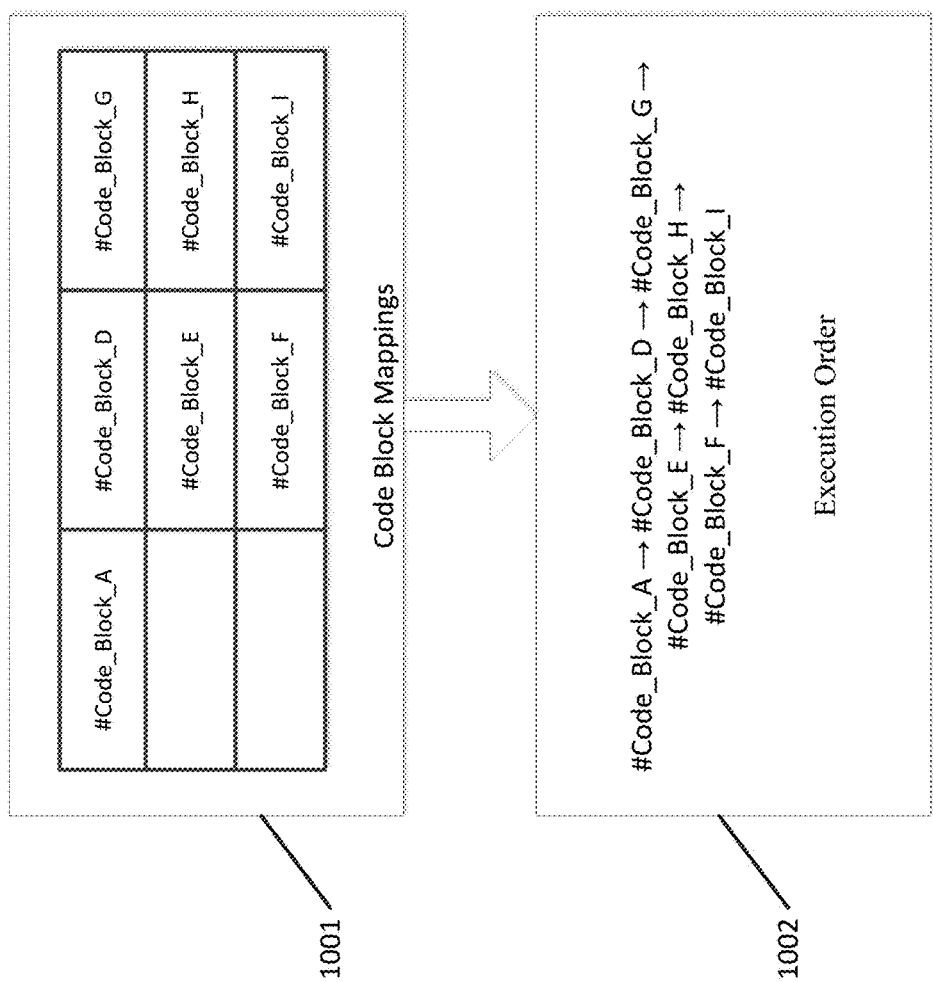
FIG. 10 illustrates an example of the execution order for a Sparkin description according to an exemplary embodiment.

FIG. 10 illustrates an example of the execution order for the Sparkin description 1001. As shown in box 1002, code blocks A, D, and G are executed first, in that order. This is followed by code blocks E and H, and then by code blocks F and I.

In certain scenarios a particular statement in a cell of a step may require passing parameters to a code block. This is accomplished by storing the parameter values for each of the parameters separately, such as in a parameter table, linking the parameters with the cell, passing a set of parameter values as arguments when the code block corresponding to the cell is executed.

Figure 11:
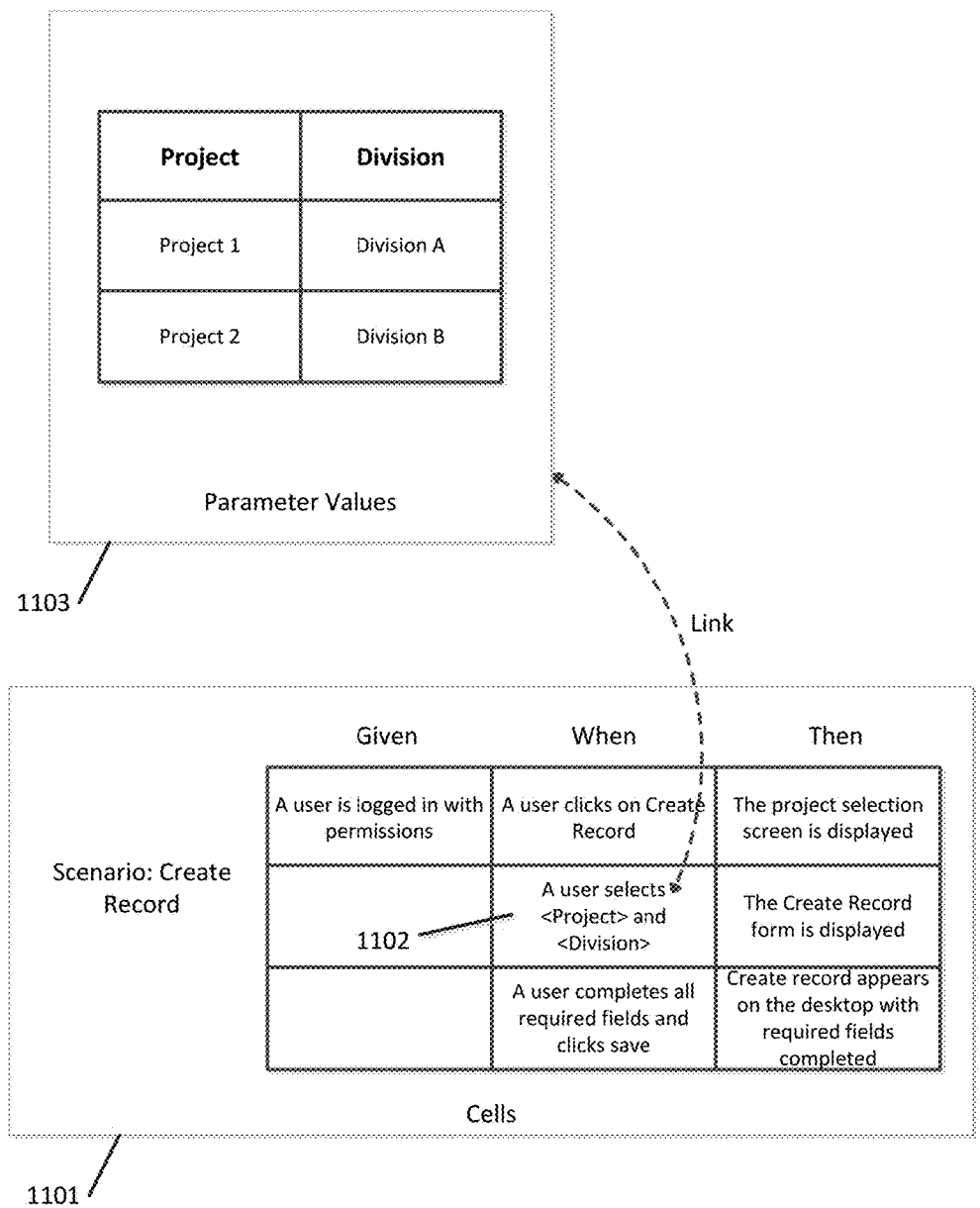
FIG. 11 illustrates a link between parameters values and a cell in a plurality of cells of a Sparkin description according to an exemplary embodiment.

FIG. 11 illustrates the link between parameters values 1103 and a cell 1102 in the plurality of cells of a Sparkin description 1101. As shown in FIG. 11, there is a link between the table storing the parameter values corresponding to parameters "Project" and "Division" and the cell in the action column of the second step. Similar to the other mappings, this link can be stored in the appropriate data structure within the Sparkin system. The link can be created when a statement in a cell comprises syntax corresponding to a parameter. In this example, the statement in cell 1102 clearly includes the syntax element <parameter>. The Sparkin backend system can detect these syntax elements of the statement and automatically create a parameter table for the parameter contained within the syntax. That parameter table can then be linked to the cell which contains the statement. Of course, the syntax utilized to denote parameters can vary, and this example is provided for illustration only. Additionally, parameter values for parameters can be stored in a variety of data structures, such as tables, arrays, linked lists, or any other data structure which can iterate through the parameter values.

Figure 12:
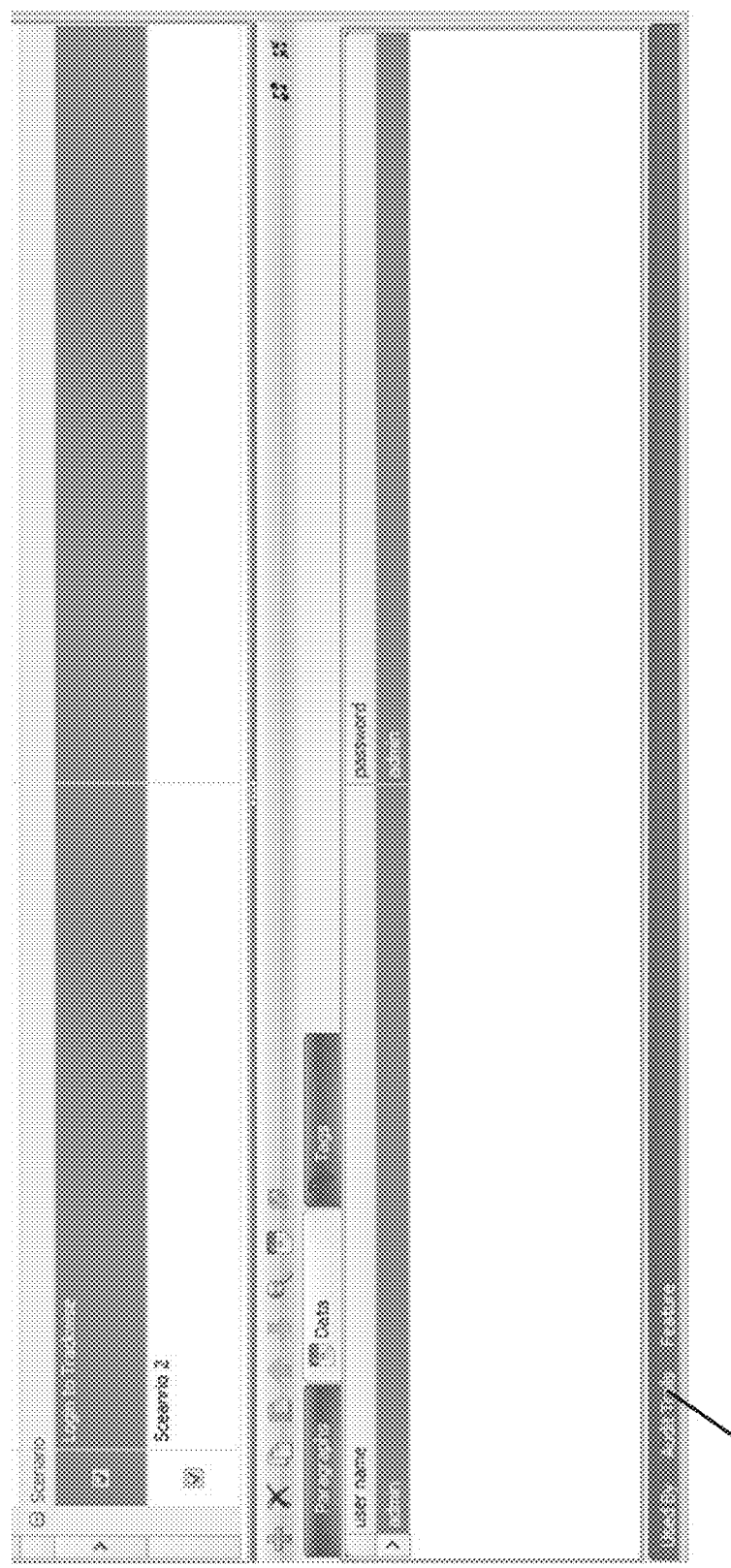
FIG. 12 illustrates an interface including a data tab which lists all of the parameters corresponding to a scenario according to an exemplary embodiment.

Parameter values 1103 can also be linked to a particular scenario, so that a user can view, access, and modify all of the parameters connected to a particular scenario through a single interface. For example, FIG. 12 illustrates an interface 1202 including a data tab which lists all of the parameters corresponding to a scenario shown in the upper portion of interface 1202. In this case, the parameters "user name" and "password" are linked to the scenario "Login to Trackwise." Additionally, parameter values are defined for each of the parameters. Specifically, the parameter value "admin" is defined for the parameter "user name" and the parameter value "admin" is defined for the parameter "password." A user can specify additional parameter values for any of the parameters through interface 1202. For example, a user can type in whichever parameter values they wish to test. Additionally, the user can import parameter values from a document stored in a structured format, such as an excel spreadsheet containing parameter values for a set of parameters defined in the first row.

A user can select some element of a user interface of the Sparkin system to indicate that execution of the functional tests in the Sparkin description is desired. When this input is received, execution of scenarios corresponding to the functional tests in the description can proceed as discussed previously. However, if a scenario includes cells having parameters and multiple values for those parameters, then that scenario (and all of the cells in it) can be repeated for different values of the parameters. As discussed earlier, the plurality of cells can be grouped into the scenarios. Therefore, this mapping between cells and groups can be utilized to determine which cells need to be repeated when parameterized values are included in a particular scenario.

Figure 13:
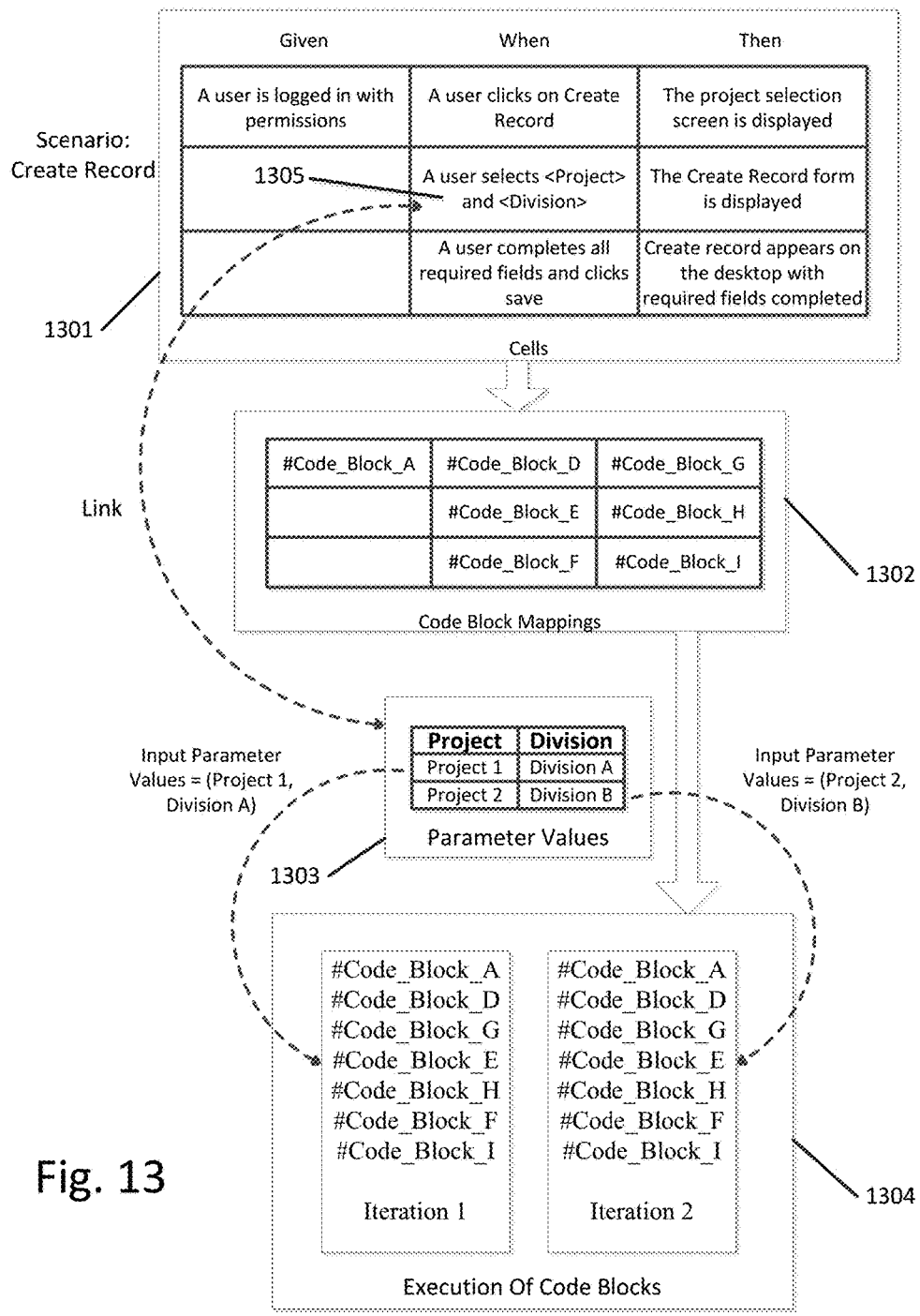
FIG. 13 illustrates an example of executing a plurality of blocks of executable code to produce an output by iterating through the plurality of cells when there are statements in one or more cells of the scenario description which include parameters.

FIG. 13 illustrates an example of executing the plurality of blocks of executable code to produce an output by iterating through the plurality of cells when there are statements in one or more cells of the scenario description which include parameters.

Cell 1305 in Sparkin scenario description 1301 has a statement including parameters "Project" and "Division." The presence of these parameters in the cell statement can trigger creation of a corresponding parameter values data structure, such as parameters values table 1303. As shown in FIG. 13, parameter values table 1303 lists two sets of parameter values previously entered by the user (such as by using the previously discussed data tab) which correspond to the parameters "Project" and "Division." As shown in FIG. 13, the parameter values table 1303 is linked with cell 1305 which includes the statement having the parameters. Additionally, cox 1302 illustrates the mappings between the cells in the Sparkin scenario description 1301 and various executable code blocks, including code blocks A, D, G, E, H, F, I.

The execution order of the functional test corresponding to Sparkin scenario description 1301 is shown in box 1304. As shown in box 1305, two iterations of each of the code blocks mapped to the cells of the scenario are executed. The first iteration involves passing parameter values "Project 1" and "Division A" as arguments to code block E, whereas the second iteration involves passing parameter values "Project 2" and "Division B" as arguments to code block E. As an alternative to passing the parameter values as arguments, an identifier of the iteration can be passed to the relevant code blocks, and the code blocks can be configured to query the parameter values table or other equivalent data structure which stores the parameter values.

As shown in FIG. 13, the number of iterations of the cells of the scenario is dependent on the number of sets of parameter values. In this case, there are two sets of parameter values so two iterations are performed (one iteration corresponding to each set of parameter values).

Figure 1A:
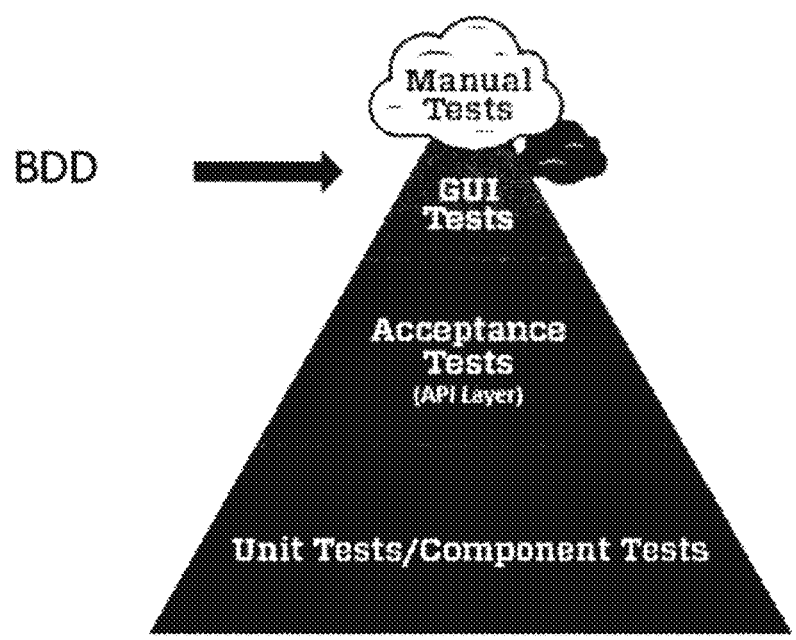
FIGS. 1A-1B illustrate a pyramid of software testing.
Figure 1B:
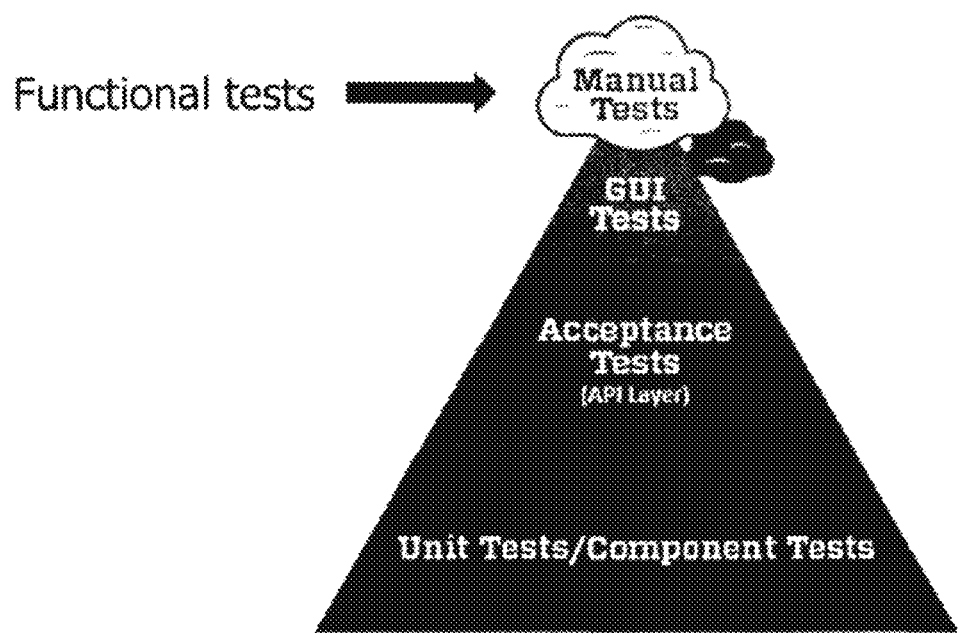

Returning to FIG. 1, at step 404 an indication of whether the software meets one or more acceptance criteria in the verification column is transmitted based at least in part on the output. The indication can be transmitted within any of the user interfaces discussed previously and/or can be output as a separate file. The indication can include multiple different indicators, such as pass/fail values for various functional tests corresponding to the scenarios and/or pass/fail values for various steps in the functional tests. Additionally, the indication can take the form of one or more log files associated with the execution of commands in the code blocks on the software. For example, the log files can indicate values for various variables, states, parameters, diagnostic measures, performance measures, errors, and other results of executing commands in the plurality of code blocks on the software.

As discussed above, the disclosed Sparkin system provides numerous advantages over implementations such as Gherkin. By eliminating the need to parse scenario descriptions, the Sparkin system avoids errors caused by typographical errors in a scenario descriptions. More significantly, direct cell-to-code block mapping described herein significantly improves performance and execution time of functional tests by eliminating the need to parse natural language statements completely. Furthermore, the format and layout of the Sparkin cells and interface corresponds to the industry standard for functional test case descriptions, enabling users to easily ascertain the purpose and scope of the functional testing.

Figure 14:
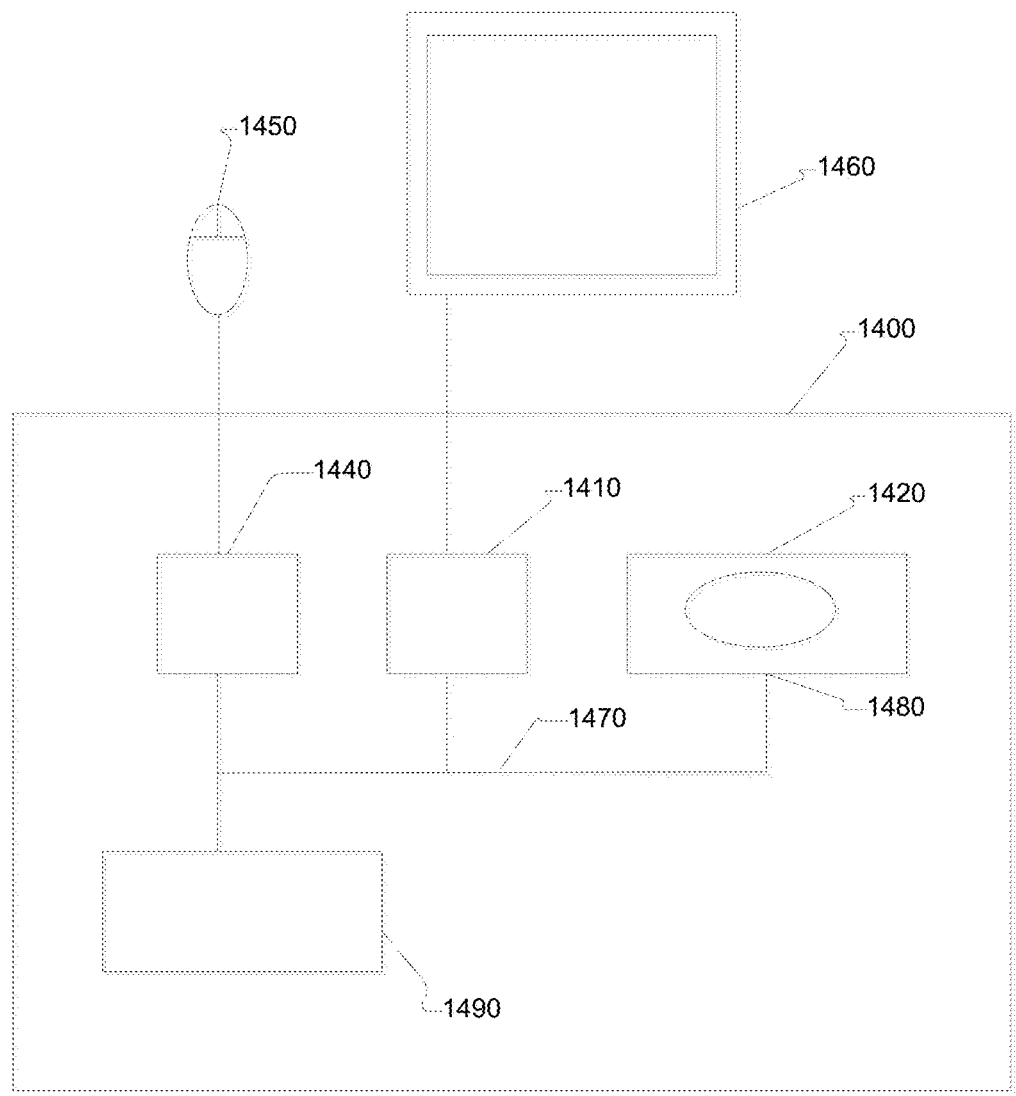
FIG. 14 illustrates an exemplary computing environment that can be used to carry out the method for performing functional testing of software.

FIG. 14 illustrates an example of a computing environment 1400 that can be used to implement the methods and systems described herein. The computing environment 1400 is not intended to suggest any limitation as to scope of use or functionality of a described embodiment.

With reference to FIG. 14, the computing environment 1400 includes at least one processing unit 1410 and memory 1420. The processing unit 1410 executes computer-executable instructions and can be a real or a virtual processor. In a multi-processing system, multiple processing units execute computer-executable instructions to increase processing power. The memory 1420 can be volatile memory (e.g., registers, cache, RAM), non-volatile memory (e.g., ROM, EEPROM, flash memory, etc.), or some combination of the two. The memory 1420 can store software instructions 1480 for implementing the described techniques when executed by one or more processors. Memory 1420 can be one memory device or multiple memory devices.

A computing environment can have additional features. For example, the computing environment 1400 includes storage 1440, one or more input devices 1450, one or more output devices 1460, and one or more communication connections 1490. An interconnection mechanism 1470, such as a bus, controller, or network interconnects the components of the computing environment 1400. Typically, operating system software or firmware (not shown) provides an operating environment for other software executing in the computing environment 1400, and coordinates activities of the components of the computing environment 1400.

The storage 1440 can be removable or non-removable, and includes magnetic disks, magnetic tapes or cassettes, CD-ROMs, CD-RWs, DVDs, or any other medium which can be used to store information and which can be accessed within the computing environment 1400. The storage 1440 can store instructions for the software 1480.

The input device(s) 1450 can be a touch input device such as a keyboard, mouse, pen, trackball, touch screen, or game controller, a voice input device, a scanning device, a digital camera, remote control, or another device that provides input to the computing environment 1400. The output device(s) 1460 can be a display, television, monitor, printer, speaker, or another device that provides output from the computing environment 1400.

The communication connection(s) 1490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1400, computer-readable media include memory 1420, storage 1440, communication media, and combinations of any of the above.

Of course, FIG. 14 illustrates computing environment 1400, display device 1460, and input device 1450 as separate devices for ease of identification only. Computing environment 1400, display device 1460, and input device 1450 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1400 can be a set-top box, mobile device, personal computer, or one or more servers, for example a farm of networked servers, a clustered server environment, or a cloud network of computing devices. Additionally, the systems and methods disclosed herein can be implemented as a web application which is accessed through a browser and over a communication connection.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware, as discussed above, and vice versa.

In view of the many possible embodiments to which the principles of our invention can be applied, we claim as our invention all such embodiments as can come within the scope and spirit of the following claims and equivalents thereto

We claim:

1. A method executed by one or more computing devices for performing functional testing of software, the method comprising:
   storing, by at least one of the one or more computing devices, a plurality of statements in a plurality of cells, the plurality of cells being organized in a plurality of columns and a plurality of rows, wherein the plurality of columns include a verification column and wherein each statement in the verification column corresponds to an acceptance criterion for a step of a functional test of the software;
   storing, by at least one of the one or more computing devices, a plurality of mappings linking the plurality of cells to a plurality of blocks of executable code, wherein each mapping in the plurality of mappings stores a correspondence between a unique cell in the plurality of cells and a corresponding block of executable code in the plurality of blocks of executable code and wherein each block of executable code is configured to execute one or more commands on the software;
   executing, by at least one of the one or more computing devices, the plurality of blocks of executable code to produce an output by iterating through the plurality of cells and executing each executable block of code linked to each corresponding cell without parsing any textual content within the plurality of cells; and
   transmitting, by at least one of the one or more computing devices, an indication of whether the software meets one or more acceptance criteria in the verification column based at least in part on the output.

2. The method of claim 1, wherein the plurality of columns include a prerequisite column and wherein each statement in the prerequisite column corresponds to an initial condition of the software for a step of the functional test of the software.

3. The method of claim 1, wherein the plurality of columns include an action column and wherein each statement in the action column corresponds to an action performed on the software for a step of the functional test of the software.

4. The method of claim 1, wherein executing the plurality of blocks of executable code to produce an output by iterating through the plurality of cells and executing each executable block of code linked to each corresponding cell comprises:
   performing a row execution step on an initial row in the plurality of rows, wherein the row execution step iteratively executes all executable blocks linked to cells in a row and wherein the row execution step executes all executable blocks in a column order; and
   repeating the row execution step for each remaining row in the plurality of rows.

5. The method of claim 1, wherein a statement in the plurality of statements comprises a parameter, and further comprising:
   storing, by at least one of the one or more computing devices, a plurality of parameter values corresponding to the parameter; and
   linking, by at least one of the one or more computing devices, a cell corresponding to the statement to the plurality of parameter values.

6. The method of claim 5, wherein the plurality of cells are grouped into one or more scenarios, wherein the cell corresponds to a scenario in the one or more scenarios, and wherein executing the plurality of blocks of executable code to produce an output by iterating through the plurality of cells and executing each executable block of code linked to each corresponding cell comprises:
   executing a plurality of iterations of one or more blocks of executable code linked to one or more cells of the scenario, wherein each iteration in the plurality of iterations corresponds to a parameter value in the plurality of parameter values and wherein each parameter value is passed as an argument to a block of executable code linked to the cell during each iteration.

7. The method of claim 1, wherein the plurality of mappings are specified by a user through a user interface.

8. An apparatus for performing functional testing of software, the apparatus comprising:
   one or more processors; and
   one or more memories operatively coupled to at least one of the one or more processors and having instructions stored thereon that, when executed by at least one of the one or more processors, cause at least one of the one or more processors to:

store a plurality of statements in a plurality of cells, the plurality of cells being organized in a plurality of columns and a plurality of rows, wherein the plurality of columns include a verification column and wherein each statement in the verification column corresponds to an acceptance criterion for a step of a functional test of the software;

store a plurality of mappings linking the plurality of cells to a plurality of blocks of executable code, wherein each mapping in the plurality of mappings stores a correspondence between a unique cell in the plurality of cells and a corresponding block of executable code in the plurality of blocks of executable code and wherein each block of executable code is configured to execute one or more commands on the software;

execute the plurality of blocks of executable code to produce an output by iterating through the plurality of cells and executing each executable block of code linked to each corresponding cell without parsing any textual content within the plurality of cells; and transmit an indication of whether the software meets one or more acceptance criteria in the verification column based at least in part on the output.

9. The apparatus of claim 8, wherein the plurality of columns include a prerequisite column and wherein each statement in the prerequisite column corresponds to an initial condition of the software for a step of the functional test of the software.

10. The apparatus of claim 8, wherein the plurality of columns include an action column and wherein each statement in the action column corresponds to an action performed on the software for a step of the functional test of the software.

11. The apparatus of claim 8, wherein the instructions that, when executed by at least one of the one or more processors, cause at least one of the one or more processors to execute the plurality of blocks of executable code to produce an output by iterating through the plurality of cells and executing each executable block of code linked to each corresponding cell further cause at least one of the one or more processors to:

perform a row execution step on an initial row in the plurality of rows, wherein the row execution step iteratively executes all executable blocks linked to cells in a row and wherein the row execution step executes all executable blocks in a column order; and repeat the row execution step for each remaining row in the plurality of rows.

12. The apparatus of claim 8, wherein a statement in the plurality of statements comprises a parameter and wherein at least one of the one or more memories has further instructions stored thereon that, when executed by at least one of the one or more processors, cause at least one of the one or more processors to:

store a plurality of parameter values corresponding to the parameter; and link a cell corresponding to the statement to the plurality of parameter values.

13. The apparatus of claim 12, wherein the plurality of cells are grouped into one or more scenarios, wherein the cell corresponds to a scenario in the one or more scenarios, and wherein the instructions that, when executed by at least one of the one or more processors, cause at least one of the one or more processors to execute the plurality of blocks of executable code to produce an output by iterating through the plurality of cells and executing each executable block of code linked to each corresponding cell further cause at least one of the one or more processors to:

execute a plurality of iterations of one or more blocks of executable code linked to one or more cells of the scenario, wherein each iteration in the plurality of iterations corresponds to a parameter value in the plurality of parameter values and wherein each parameter value is passed as an argument to a block of executable code linked to the cell during each iteration.

14. The apparatus of claim 8, wherein the plurality of mappings are specified by a user through a user interface.

15. At least one non-transitory computer-readable medium storing computer-readable instructions that, when executed by one or more computing devices, cause at least one of the one or more computing devices to:

store a plurality of statements in a plurality of cells, the plurality of cells being organized in a plurality of columns and a plurality of rows, wherein the plurality of columns include a verification column and wherein each statement in the verification column corresponds to an acceptance criterion for a step of a functional test of software;

store a plurality of mappings linking the plurality of cells to a plurality of blocks of executable code, wherein each mapping in the plurality of mappings stores a correspondence between a unique cell in the plurality of cells and a corresponding block of executable code in the plurality of blocks of executable code and wherein each block of executable code is configured to execute one or more commands on the software;

execute the plurality of blocks of executable code to produce an output by iterating through the plurality of cells and executing each executable block of code linked to each corresponding cell without parsing any textual content within the plurality of cells; and transmit an indication of whether the software meets one or more acceptance criteria in the verification column based at least in part on the output.

16. The at least one non-transitory computer-readable medium of claim 15, wherein the plurality of columns include a prerequisite column and wherein each statement in the prerequisite column corresponds to an initial condition of the software for a step of the functional test of the software.

17. The at least one non-transitory computer-readable medium of claim 15, wherein the plurality of columns include an action column and wherein each statement in the action column corresponds to an action performed on the software for a step of the functional test of the software.

18. The at least one non-transitory computer-readable medium of claim 15, wherein the instructions that, when executed by at least one of the one or more computing devices, cause at least one of the one or more computing devices to execute the plurality of blocks of executable code to produce an output by iterating through the plurality of cells and executing each executable block of code linked to each corresponding cell further cause at least one of the one or more computing devices to:

perform a row execution step on an initial row in the plurality of rows, wherein the row execution step iteratively executes all executable blocks linked to cells in a row and wherein the row execution step executes all executable blocks in a column order; and repeat the row execution step for each remaining row in the plurality of rows.

19. The at least one non-transitory computer-readable medium of claim 15, wherein a statement in the plurality of statements comprises a parameter and wherein at least one of the one or more memories has further instructions stored thereon that, when executed by at least one of the one or more computing devices, cause at least one of the one or more computing devices to:
   store a plurality of parameter values corresponding to the parameter; and
   link a cell corresponding to the statement to the plurality of parameter values.

20. The at least one non-transitory computer-readable medium of claim 19, wherein the plurality of cells are grouped into one or more scenarios, wherein the cell corresponds to a scenario in the one or more scenarios, and wherein the instructions that, when executed by at least one of the one or more computing devices, cause at least one of the one or more computing devices to execute the plurality of blocks of executable code to produce an output by iterating through the plurality of cells and executing each executable block of code linked to each corresponding cell further cause at least one of the one or more computing devices to:
   execute a plurality of iterations of one or more blocks of executable code linked to one or more cells of the scenario, wherein each iteration in the plurality of iterations corresponds to a parameter value in the plurality of parameter values and wherein each parameter value is passed as an argument to a block of executable code linked to the cell during each iteration.

21. The at least one non-transitory computer-readable medium of claim 15, wherein the plurality of mappings are specified by a user through a user interface.

* * * * *